(12) United States Patent
Stone (10) Patent No.: US 10,847,853 B1
(45) Date of Patent: Nov. 24, 2020

(54) BROADBAND WINDOWS

(71) Applicant: Wavefront Research, Inc., Bethlehem, PA (US)

(72) Inventor: Thomas W. Stone, Hellertown, PA (US)

(73) Assignee: Wavefront Research, Inc., Northhampton, PA (US)

( * ) Notice: Subject to any disclaimer, the term of this patent is extended or adjusted under 35 U.S.C. 154(b) by 80 days.

(21) Appl. No.: 15/819,365

(22) Filed: Nov. 21, 2017

Related U.S. Application Data (60) Provisional application No. 62/425,548, filed on Nov. 22, 2016.

(51) Int. Cl.
| | | |
|---|---|---|
| H01P 1/08 | (2006.01) | |
| G02B 5/30 | (2006.01) | |
| G02B 1/115 | (2015.01) | |
| G02B 1/14 | (2015.01) | |
| B82Y 20/00 | (2011.01) | |

(52) U.S. Cl.
CPC ............... *H01P 1/08* (2013.01); *G02B 1/115* (2013.01); *G02B 1/14* (2015.01); *G02B 5/3041* (2013.01); *B82Y 20/00* (2013.01)

(58) Field of Classification Search
CPC .. H01P 1/08; G02B 1/14; G02B 1/115; G02B 5/3041; G02B 7/02; B82Y 20/00
USPC ........................................................ 359/350
See application file for complete search history.

(56) References Cited

U.S. PATENT DOCUMENTS

| | | | |
|---|---|---|---|
| 2,997,590 A | 8/1961 | Lyons et al. | |
| 3,458,379 A | 7/1969 | Heimann et al. | |
| 7,504,154 B2 * | 3/2009 | Johnson | G02B 1/105 |
| | | | 428/417 |
| 9,523,804 B2 | 12/2016 | Wach | |
| 2010/0103509 A1 * | 4/2010 | Robinson | G01J 5/02 |
| | | | 359/356 |
| 2010/0246013 A1 * | 9/2010 | Youn | G02B 5/22 |
| | | | 359/584 |

* cited by examiner

*Primary Examiner* — Collin X Beatty
(74) *Attorney, Agent, or Firm* — Culhane Meadows PLLC; Orlando Lopez (57) ABSTRACT

Broadband windows that transmit light simultaneously across several spectral bands are disclosed.

10 Claims, 9 Drawing Sheets

BROADBAND WINDOWS

CROSS REFERENCE TO RELATED APPLICATIONS

This application claims priority from U.S. Provisional Patent Application Ser. No. 62/425,548, filed Nov. 22, 2016, entitled REPLACEABLE BROAD-BAND WINDOWS and incorporated herein by reference in its entirety for all purposes.

BACKGROUND

This invention relates generally to broadband windows that transmit light (light as used herein refers to electromagnetic radiation) simultaneously across spectral bands, and, more particularly, to broadband Windows that transmit light across spectral bands that include the near ultraviolet spectrum and/or the visible spectrum and/or the near infrared spectrum and/or the shortwave infrared spectrum and/or the mid-wave infrared spectrum and/or the longwave infrared spectrum.

There is a need for broadband windows that transmit light (electromagnetic radiation) simultaneously across spectral bands that include: the near ultraviolet spectrum (e.g., wavelength range nominally 0.2 microns to 0.4 microns); and/or the visible spectrum (e.g., wavelength range nominally 0.4 microns to 0.7 microns); and/or the near infrared spectrum (e.g., wavelength range nominally 0.7 microns to 1 micron); and/or the shortwave infrared spectrum (e.g., wavelength range nominally 1 micron to 2.5 microns); and/or the mid-wave infrared spectrum (e.g., wavelength range nominally 3 microns to 5 microns); and/or the longwave infrared spectrum (e.g., wavelength range nominally 8 microns to 12 microns, or 7.5 microns to 14.5 microns); and beyond, e.g., to wavelengths to and exceeding 40 microns. As an example, windows are needed that can transmit wavelengths spanning the range below 0.4 µm to beyond 14.5 µm. And it is highly desirable that such broadband Windows introduce as little loss as possible while transmitting this broad range of wavelengths through the window. Sources of this loss that need to be minimized include internal absorption in the window material as well as reflections from the interfaces between the window and the surrounding media.

BRIEF SUMMARY

Broadband windows that transmit light simultaneously across several spectral bands are disclosed hereinbelow.

In one or more embodiments, the broadband optical window of these teachings includes a hygroscopic broadband window having significant transmission substantially across at least the visible spectral band and the long wave infrared spectral band, where the hygroscopic broadband window has at least two faces, and a layer adjacent to one of the at least two faces, the layer being optically disposed on the hygroscopic broadband window and including a non-water-soluble broadband material, where the layer has significant transmission substantially across at least the visible spectral band and the long wave infrared spectral band and has sufficient thickness to protect the hygroscopic window from water or water vapor, so that the layer is configured to protect the hygroscopic window from water or water vapor.

One or more embodiments of the replaceable hygroscopic broadband optical window module of these teachings are also disclosed.

One or more embodiments of a broadband hygroscopic optical window assembly of these teachings are also disclosed.

In one instance, the embodiments of the replaceable hygroscopic broadband optical window module and the embodiments of the broadband hygroscopic optical window assembly include an embodiment of the broadband optical window these teachings.

Other embodiments are also disclosed.

For a better understanding of the present teachings, together with other and further objects thereof, reference is made to the accompanying drawings and detailed description and its scope will be pointed out in the appended claims.

DETAILED DESCRIPTION

Broadband windows that transmit light simultaneously across several spectral bands are disclosed hereinbelow.

Some candidates for windows with such a broad range and transmission include diamond, potassium bromide, and potassium chloride, among others. Single crystal diamond windows are excellent but very expensive. Polycrystalline diamond windows are getting better every year but still exhibit high scatter at the shorter wavelengths. And due to the high refractive index of diamond, surface reflections are large and may need to be managed with antireflection coatings.

Window materials composed of salts such as potassium bromide and potassium chloride have tremendous advantages because they can be very inexpensive and low loss and have a relative low refractive index so that surface reflections start out low and can be reduced with some coatings. For example 6 or 8 inch diameter potassium bromide crystals that are over an inch thick can be obtained in quantity for only hundreds of dollars. However these materials are relatively soft and weak and hygroscopic and water soluble. The inventions described herein include devices that provide for inexpensive and removable and easily replaceable windows that are compatible with the unique requirements and enable the unique benefits of broadband window materials. Such inexpensive replaceable windows can provide tremendously broad spectral band transmission at a very low cost enabling a scenario where they are simply replaced when they are damaged and yet provide lower loss (due to absorption, scatter, surface reflections, etc.) over broader wavelength ranges than can be obtained by other means.

Figure 1:
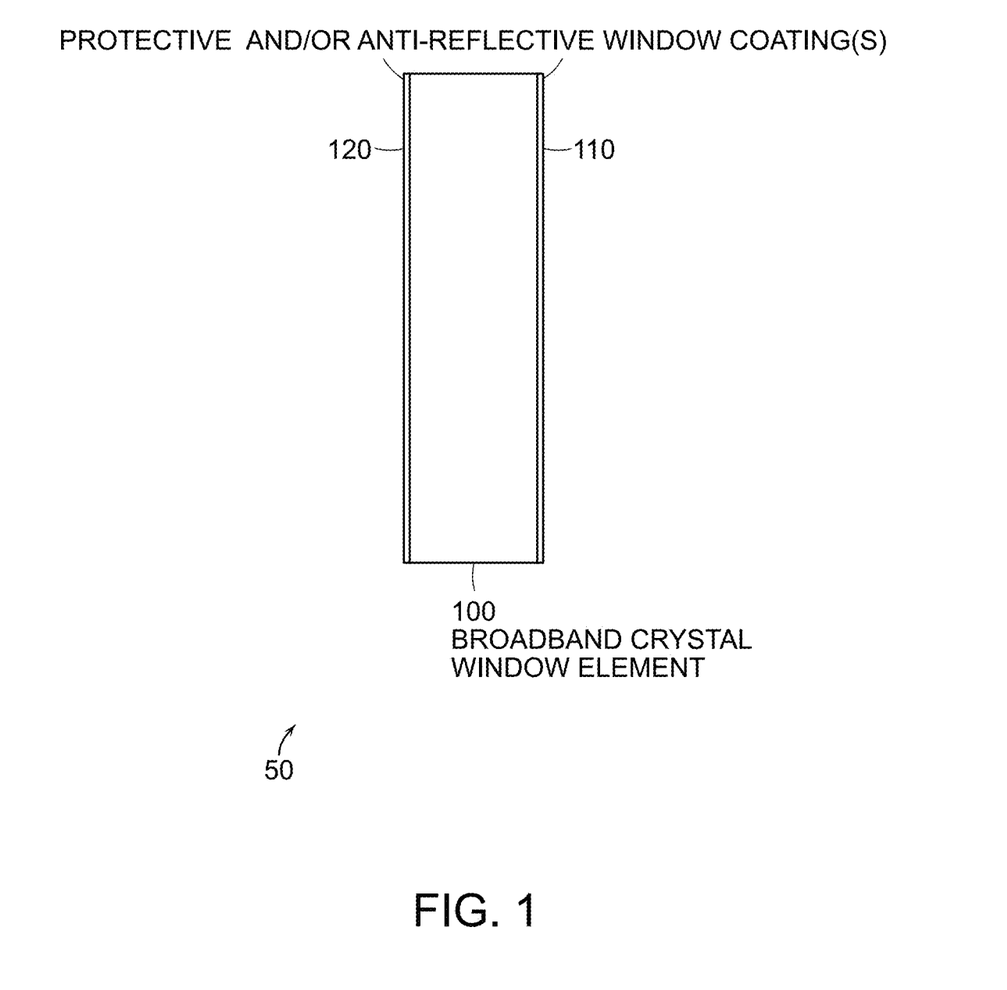
FIG. 1 is a schematic representation of one embodiment of the broadband window of these teachings.

The system 50 in FIG. 1 includes a broadband window comprising window element 100 which is a crystal of potassium bromide. The faces of the broadband window 50 comprise coatings or layers 110 and 120. These coatings can be used to protect the window element 100 from humidity, water, solvents, abrasion, scratching, chipping, etc., and, optionally, by proper choice of composition or thickness or refractive index can be used to reduce surface reflections at the interfaces where they are coated. In one embodiment these are single or multilayer thin-film coatings as is practiced in the industry to reduce reflections at interfaces.

The window element 100 is shown in FIG. 1 as being made from potassium bromide, but other optical materials can be used in this place such as, but not limited to, potassium chloride, lithium fluoride, magnesium fluoride, calcium fluoride, barium fluoride, silicon dioxide, Sapphire, potassium chloride, sodium chloride, zinc sulfide, thallium bromoiodide, zinc selenide, AMTIR, gallium arsenide, silicon, germanium, cesium iodide, silver bromide, silver chloride, diamond, etc. For reasons cited above, the salt materials such as potassium bromide, potassium chloride, sodium chloride, silver chloride, silver bromide, etc. are desirable since they typically exhibit extremely broad spectral transmission and low cost.

The coatings 110 and 120 each comprise single or multiple coatings or layers of other materials that can include for example and without limitation spun-on glasses, glasses, polymers, sol-gels, and other optical materials listed above for element 100. Further the coatings 100 and 120 may comprise surface structures (often micro- and nanoscale) to reduce surface reflections or impart strength. The coatings 100 and 120 can include materials that have poorer transmission ranges then the window element 100 since they can be much thinner than window element 100 and still afford protection.

For example and without limitation, the layers 110 and 120 in FIG. 1 can be made from a thin layer of diamond or zinc sulfide or zinc selenide. These materials exhibit substantial transmission in both the visible and long wave infrared spectral bands, are not water soluble, and are harder and stronger than the salt windows. These layers can also be deposited in thicknesses where the surface reflections at the two sides of the layers are out of phase and thereby minimize reflection loss. These layers may be deposited by a broad variety of means including, without limitation, chemical vapor deposition, sputtering, optical contacting, etc. as established in the state of the art for the materials used in the layer or coating. The system 60 in FIG. 2 includes a window element 100 and optional coatings 110 and 120 and also include optional edge coatings 130 and 140. Edge coatings 130 and 140 are used to protect the edges of window element 100 from humidity, water, solvents, abrasion, chipping etc. Edge coatings 130 and 140 can comprise any of the materials described above for coatings 110 and 120 but other non-optical materials, including opaque materials, can also be used for this purpose, such as opaque epoxies, silicone rubbers, and potting compounds since they do not also need to transmit light. Protective coatings 130 and 140 also do not need to be particularly uniform since they do not transmit light.

Figure 2:
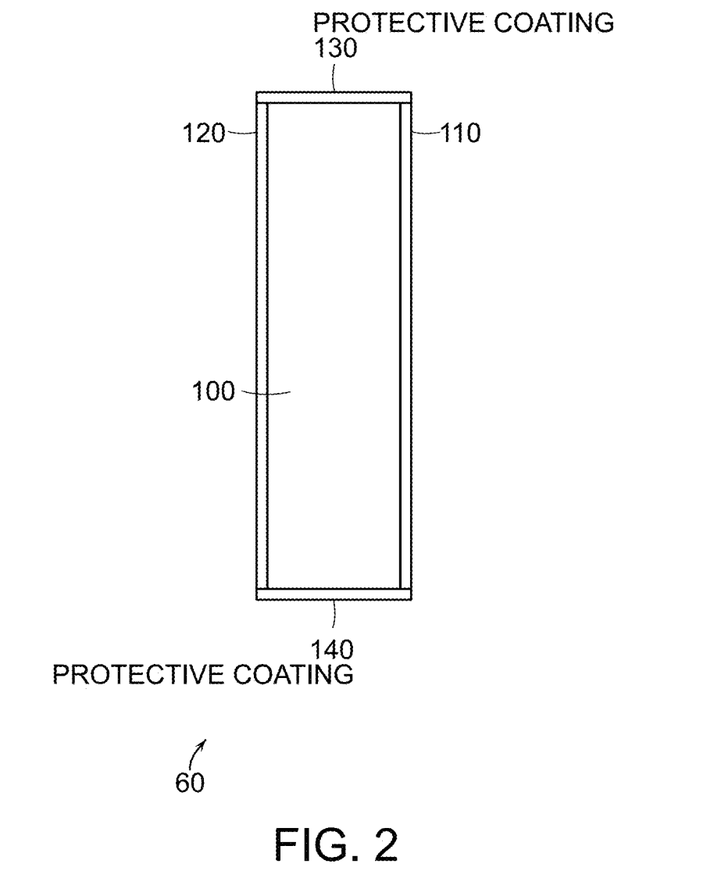
FIG. 2 is a schematic representation of another embodiment of the broadband window of these teachings.
Figure 3:
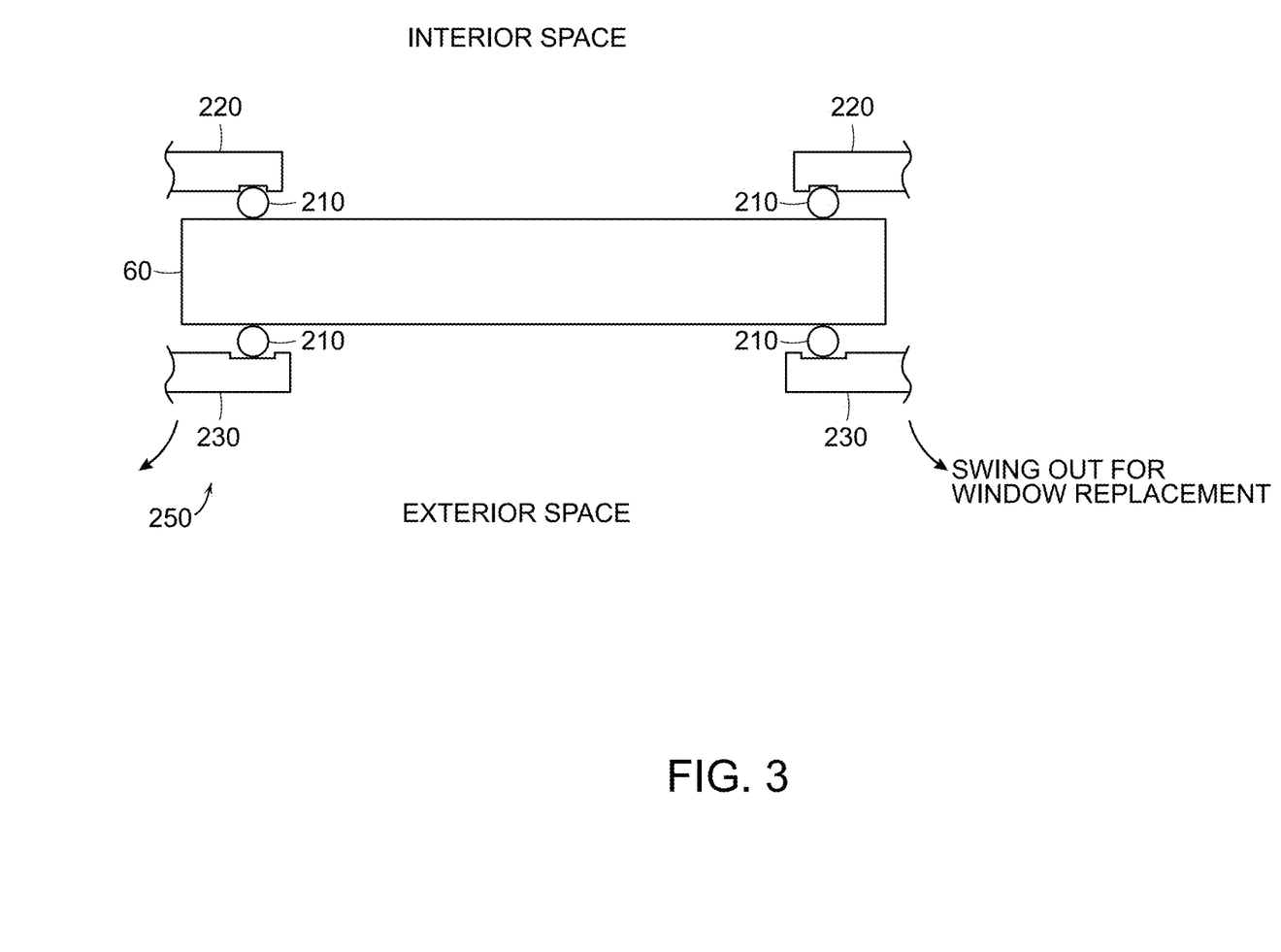
FIG. 3 is a schematic representation of an embodiment of the replaceable broadband window of these teachings.

The replaceable broadband window system 250 shown in FIG. 3 comprises broadband window system 60 from FIG. 2 in addition to mounts 220 and 230, each utilizing O-ring seals 210. This window system 250 is used to separate and interior space from an exterior space, such as interior and exterior space divisions created by chambers, bell jars, Dewars, gimbals, pods, test chambers, etc. Using terminology that is accepted by those skilled in the art, windows such as these are typically used to create an optical aperture in such structures while at the same time preventing flow of material such as air, wind, rain, particulates, etc. between the interior and exterior spaces. The mounts 220 and 230 are used to support the broadband window system 60. O-rings 210 provide resilient low stress mounting of the window system 60 and can also provide a water, liquid, and vapor barrier that prevents the edges of window system 60 from degradation, particularly if it is not side coated. In system 250 of FIG. 3 mounts 230 can be swung out of position as shown so that broadband window system 60 can be easily replaced with a new broadband window system 60 in the event of damage or breakage. While O-rings are shown other similar seals such as and without limitation, rubber gaskets, compliant polymers or materials or bushings, mechanical sleeves, clamps, adhesives, etc. of various shapes and compositions can be used. While broadband window system 60 is shown in FIG. 3 and other figures, other variations on this broadband window, such as broadband window 50 can equivalently be used.

Figure 4A:
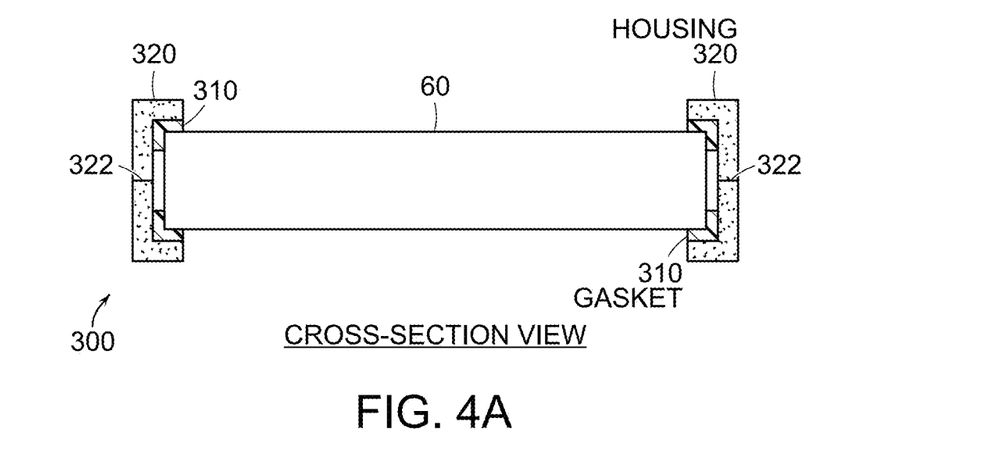
FIGS. 4A and 4B are schematic representations of another embodiment of the replaceable broadband window of these teachings.
Figure 4B:
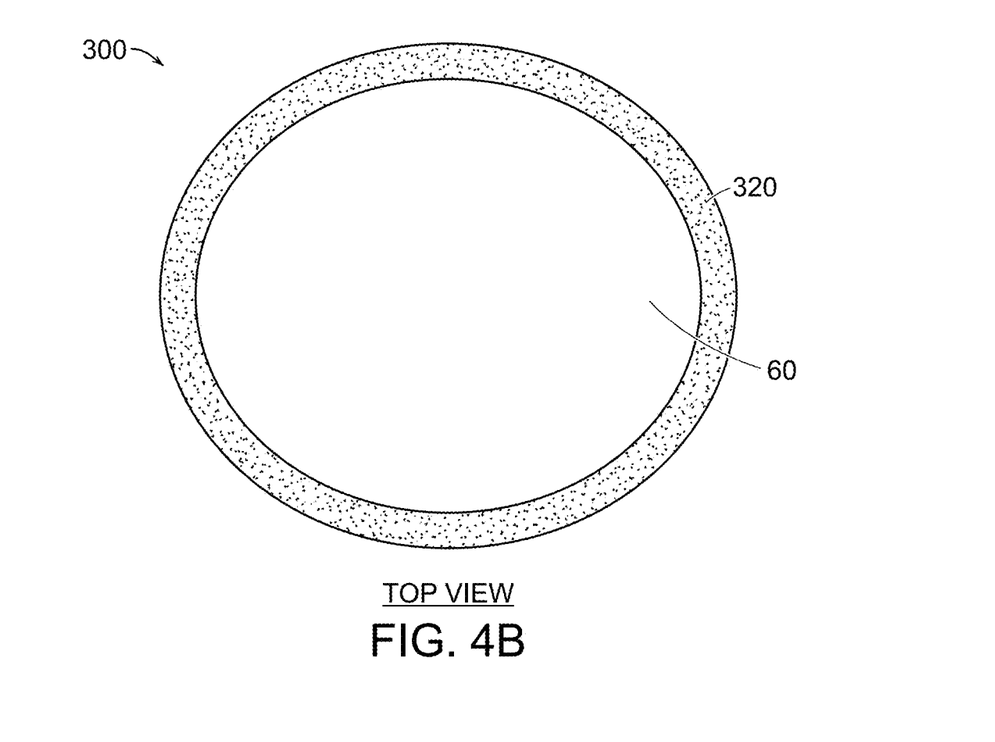

Broadband window cartridge/assembly 300 is shown in FIG. 4. In this device broadband window system 60 is mounted in housing 320 using optional resilient gaskets 310. The seals as described above can optionally be used as the resilient gasket 310. The housing 320 facilitates handling and replacement of the broadband window system. Since in many cases the broadband Windows are softer and weaker than narrower band windows, but also very often inexpensive, the means to rapidly replace the broadband window system in the event of damage, pitting, scratching, etc. is often important. Gasket 310 can be made out of resilient material such as rubber, polymers, silicone materials, etc. or may be harder materials that are for example thermal—expansion matched with the housing and window materials. Seals, such as those described above can also be used. An optional assembly joint 322 is shown in housing 322 allow for assembly of the housing around the window system 60. Many alternative housing features may be used in place of assembly joint 322, including without limitation, screw joints snap joints or joints located in other positions, as practiced in mechanical design. Housing 320 can be designed to snap into or similarly be inserted into features in the wall or aperture separating the internal and external regions.

Figure 5A:
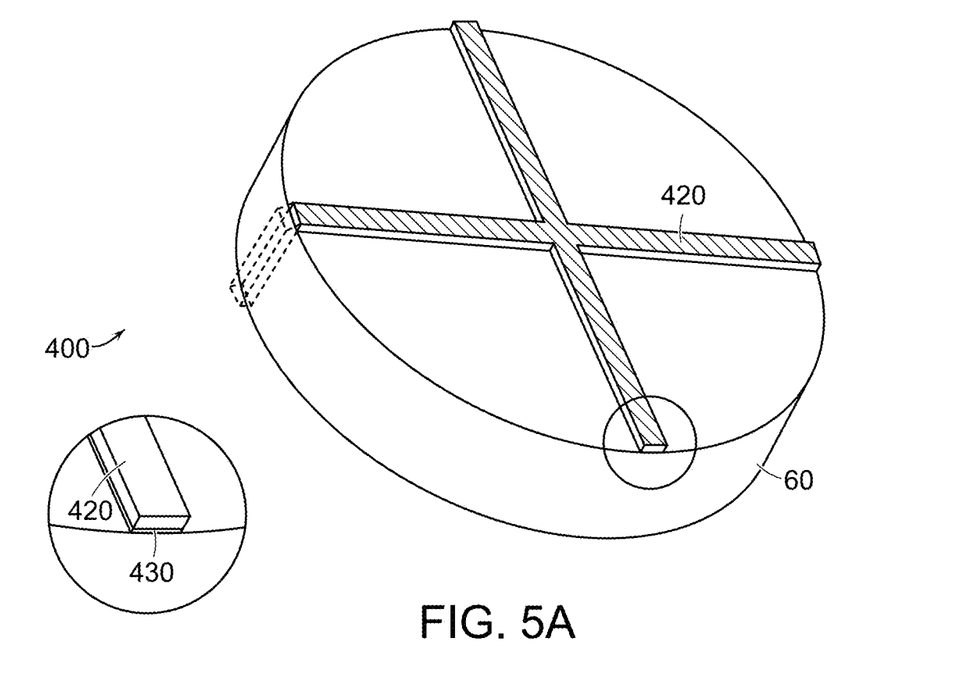
FIGS. 5A and 5B are schematic representations of yet another embodiment of the replaceable broadband window of these teachings.
Figure 5B:
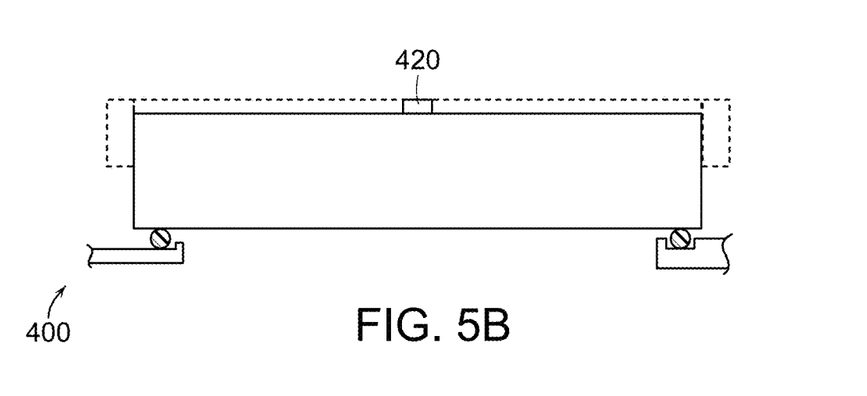

Reinforced broadband window system 400 is shown in FIG. 5. Here broadband window system 60 is augmented by structural support 420 which is shown with optional gasket layer 430 between structural support 420 and the surface of broadband window system 60. Since many of the broadband transmitting materials used broadband window system 60 are relatively weak in comparison with other window materials such as diamond, zinc sulfide, etc., relatively large thicknesses of these materials may need to be used to obtain the required window strength. The application of structural support 420 in broadband window system 400 allows thinner broadband window systems since now part of the window strength is provided by the structural support 420. In a similar fashion, this structural support 420 can enable larger broadband windows and apertures to be obtained for a given broadband window thickness. Structural support 420 can be made from strong and stiff materials such as steel, aluminum, titanium, Kovar, PEEK, etc. Use of the strong materials can minimize the dimension of the structural support which is often important since it may obscure a portion of the aperture. These obscuration's often have little effect on the performance of the optical systems they are used with such as in the case of Cassegrainian telescopes.

Figure 6:
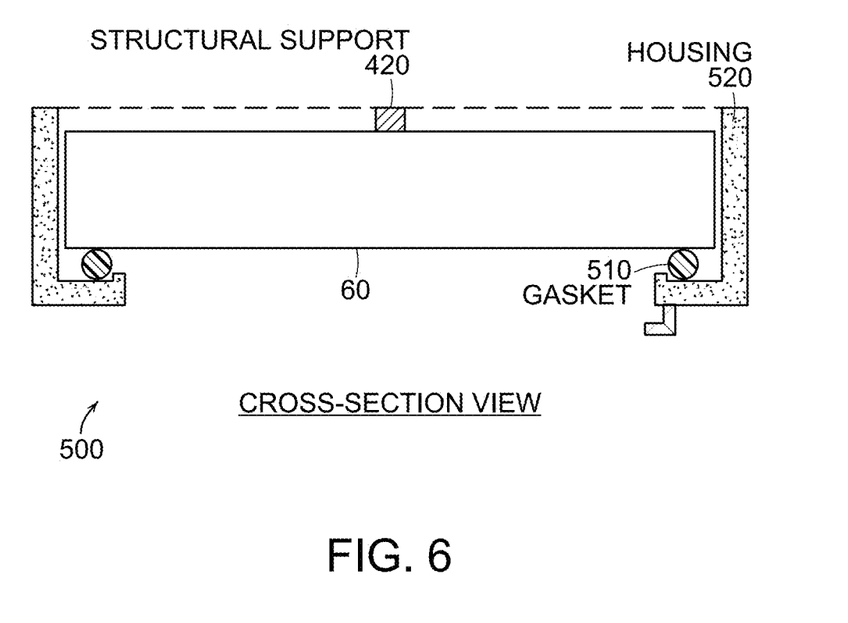
FIG. 6 is a schematic representation of still another embodiment of the replaceable broadband window of these teachings.

In FIG. 5 the structural support is shown alternatively flush with the edge of broadband window system 60 as well as protruding various distances down the side of 60. This is meant to show flexibility in interfacing to a housing as shown in the reinforced broadband window cartridge/assembly 500 in FIG. 6. In this device broadband window system 60 is mounted in housing 520 using resilient gaskets 510.

Figure 7:
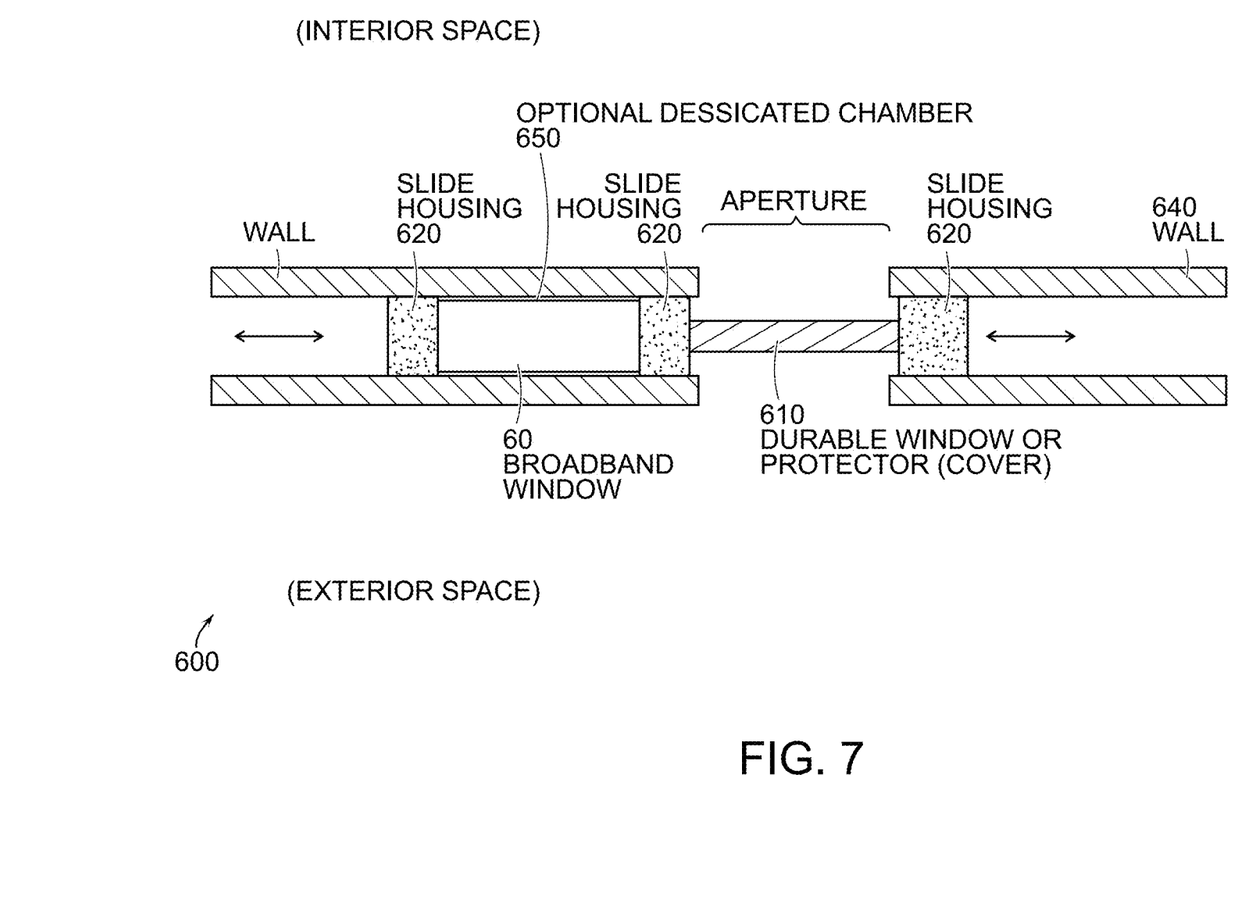
FIG. 7 is a schematic representation of an embodiment of an interchangeable broadband window of these teachings.
Figure 8:
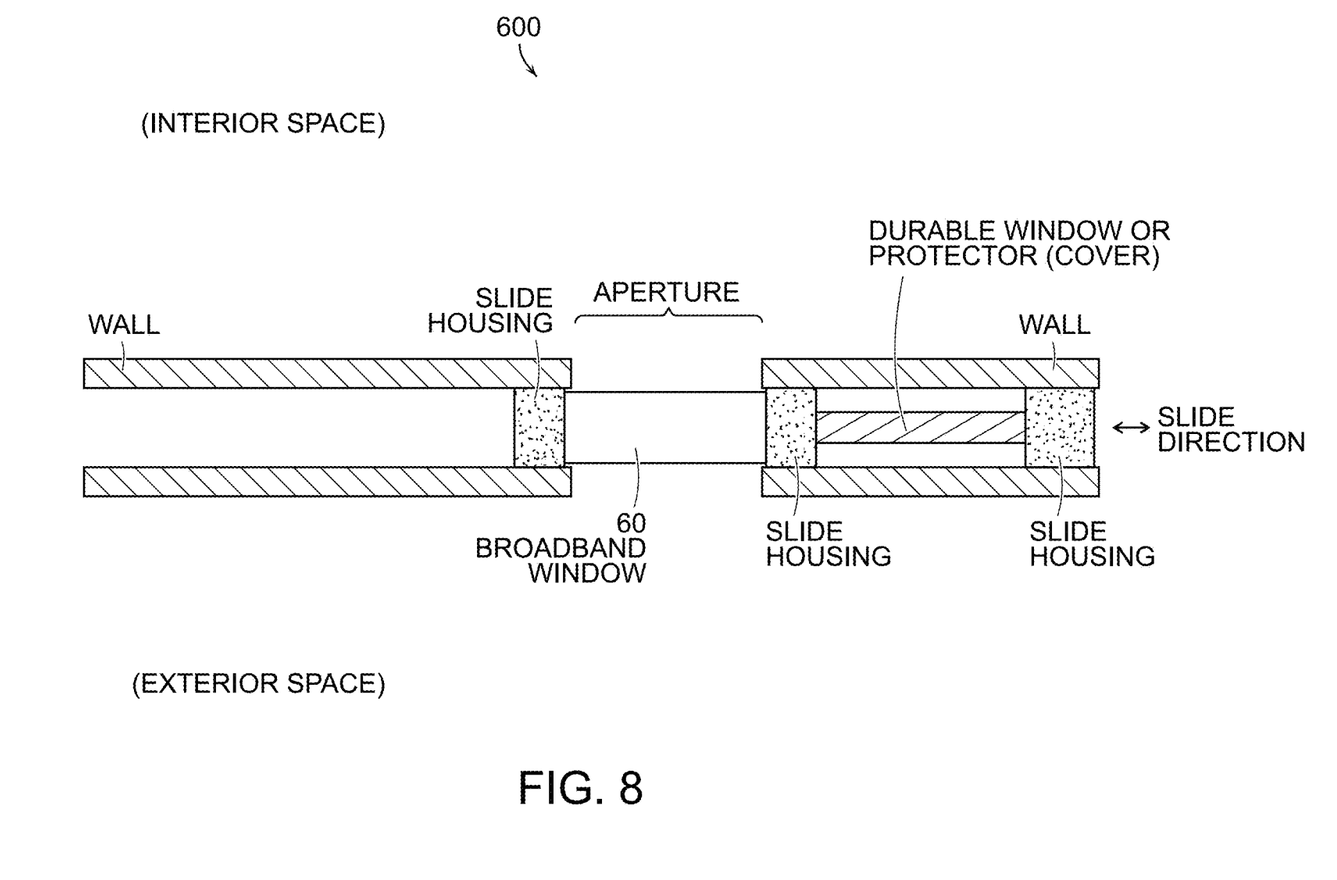
FIG. 8 is a schematic representation of another embodiment of the interchangeable broadband window of these teachings.

FIGS. 7 and 8 show protectable and interchangeable broadband window system 600 where broadband window system 60 is mounted in the slide housing 620 that also houses an alternate window or cover 610. The slide housing 620 can be used to switch positions of the windows 60 and 610 by translation, rotation, or other mechanical means. The alternate window 610 could be a backup window, or a window that's much stronger or more durable but is less transmissive, or it could be simply an opaque protective cover separating the interior and exterior spaces. FIG. 7 shows the positioning of the durable window or protector (cover) 610 in place over the aperture, while FIG. 8 shows the positioning of the broadband window 60 over the aperture. When the broadband window system 60 is required, the slide housing is moved to the right in FIG. 8 placing the broadband window in the aperture of wall 640. When the broadband window system 60 is not required, the slide housing is moved to the left in FIG. 7, placing the durable window or protector 610 in the aperture. While the broadband window 60 is not in use it can be housed in optional desiccated chamber 650 as shown in FIG. 7. The configuration of system 600 with the broadband window system 60 in the aperture is shown in FIG. 8.

Figure 9:
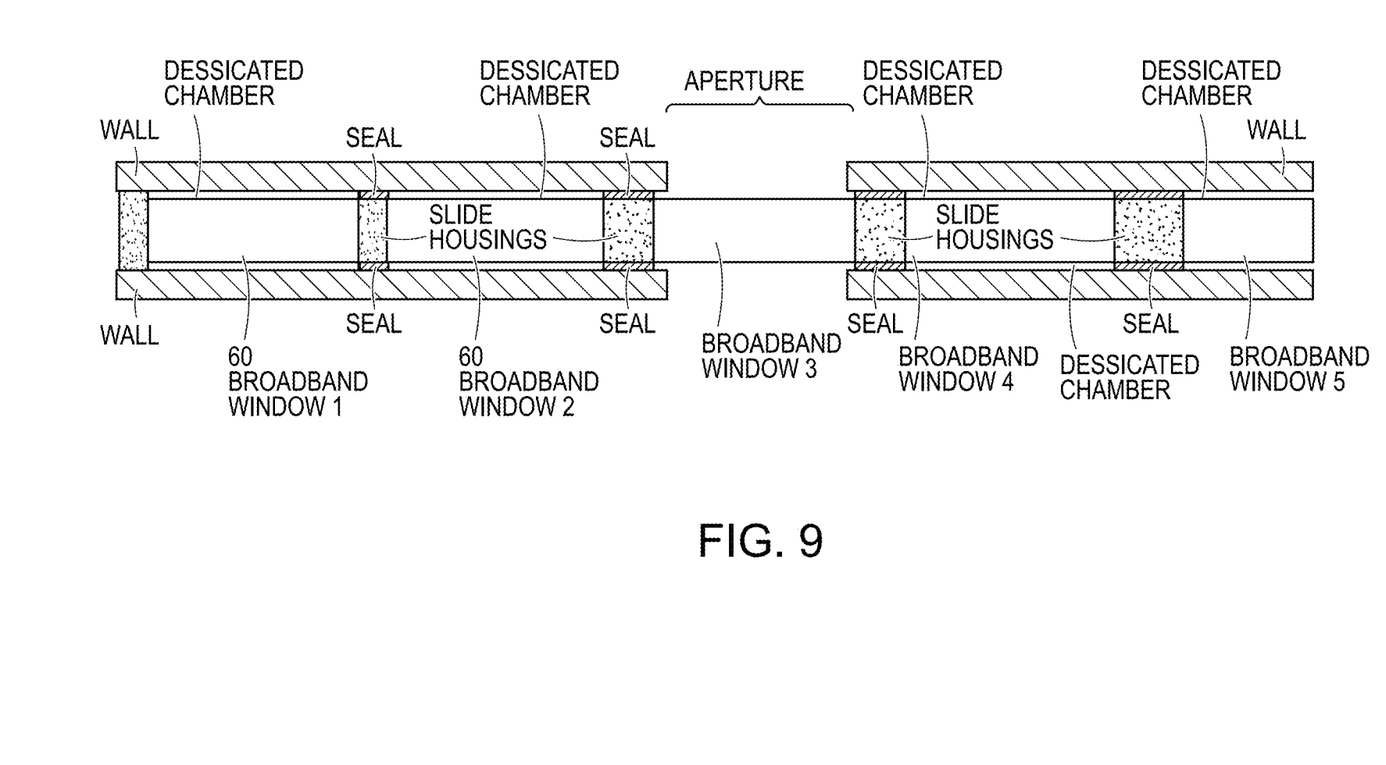
FIG. 9 is a schematic representation of yet another embodiment of the interchangeable broadband window of these teachings.

FIG. 9 shows a multiple broadband window system 600. Here five broadband window systems 60 are located in a slide housing allowing for selection and quick replacement of any of the broadband Windows in case damage or degradation occurs. Alternatively, broadband Windows with different characteristics (or protective cover(s)) can be inserted in the slide housing and selected as needed by position of the slide housing. The slide housing may moved or translated in a linear, circular, or other fashion. FIG. 9 also shows optional seals that can be used to assist the formation of optional desiccated chambers that store the broadband window systems when not in use. The chambers can be desiccated using standard desiccants or desiccating techniques.

Although specific features of the disclosure are shown in some drawings and not in others, this is for convenience only as each feature may be combined with any or all of the other features in accordance with the disclosure. Other examples will occur to those skilled in the art and are within scope of this invention.

What is claimed is:

1. A broadband hygroscopic optical window assembly comprising:
   a movable housing;
   an aperture;
   said movable housing configured to accept at least a first and a second optical window module;
   said first optical window module comprising:
   a hygroscopic broadband window having significant transmission substantially across at least the visible spectral band and the long wave infrared spectral band;
   said hygroscopic broadband window having at least two faces; and
   a layer adjacent to one of said at least two faces;
   said layer being optically disposed on said hygroscopic broadband window;
   said layer comprising a non water-soluble broadband material;
   said layer having significant transmission substantially across at least the visible spectral band and the long wave infrared spectral band;
   said layer having sufficient thickness to protect the hygroscopic window from water or water vapor;
   said layer configured to protect the hygroscopic window from water or water vapor;
   said movable housing further configured to move between at least a first position and a second position;
   said first position configured to optically dispose said first optical window module in front of the aperture;
   said second position configured to optically dispose said second optical window module in front of the aperture.

2. The broadband hygroscopic optical window assembly of claim 1 in which said second optical window module contains comprises a protective cover in place of the optical window.

3. The broadband hygroscopic optical window assembly of claim 1, wherein said hygroscopic broadband window comprises a material including at least one of potassium bromide, potassium chloride, sodium chloride, silver bromide, or silver chloride.

4. A broadband hygroscopic optical window assembly comprising:
   a movable housing;
   an aperture;
   said movable housing configured to accept at least a first and a second optical window module;
   said first optical window module comprising:
   a hygroscopic broadband window having significant transmission substantially across at least two spectral bands;
   said hygroscopic broadband window having at least two faces; and
   a layer adjacent to at least one of said at least two faces;
   said layer being optically disposed on said hygroscopic broadband window;
   said layer comprising a substantially non water-soluble material;
   said layer having significant transmission substantially across said at least two spectral bands;
   said layer configured to protect the hygroscopic window from water or water vapor;
   said movable housing further configured to move between at least a first position and a second position;
   said first position configured to optically dispose said first optical window module in front of the aperture;
   said second position configured to optically dispose said second optical window in front of the aperture.

5. The broadband hygroscopic optical window assembly of claim 4 in which said second optical window module comprises a protective cover.

6. The broadband hygroscopic optical window of claim 4 wherein said hygroscopic broadband window comprises a material including at least one of potassium bromide, potassium chloride, sodium chloride, silver bromide, or silver chloride.

7. The broadband hygroscopic optical window of claim 4 wherein said layer comprises a material including at least one of zinc selenide, zinc sulfide, or diamond.

8. A broadband optical window assembly comprising:
   a window comprising salt materials, said window having significant transmission substantially across at least two spectral bands;
   said window comprising salt materials comprising one or more salts;
   said window comprising salt materials having at least two faces; and further wherein
   said window comprising salt materials having at least one edge surface;
   a layer adjacent to at least one of said at least two faces;
   said layer being optically disposed on said salt window;
   said layer comprising a substantially non water-soluble material;
   said layer having significant transmission substantially across said at least two spectra bands;
   said layer configured to protect said salt window from water or water vapor; and
   an edge layer adjacent to said edge surface;
   said edge layer comprising a substantially non water-soluble material;
   said edge layer configured to protect said salt window from water or water vapor.

9. The broadband optical window assembly of claim 8 wherein said salt materials comprise a material including at least one of potassium bromide, potassium chloride, sodium chloride, silver bromide, or silver chloride.

10. The broadband optical window assembly of claim 8 wherein said layer comprises a material including at least one of zinc selenide, zinc sulfide, or diamond.

* * * * *